Jan. 18, 1955
C. O. MILLER
2,700,004
METHOD OF PICKLING IRON AND RECOVERING PICKLING AGENT
Filed July 15, 1953
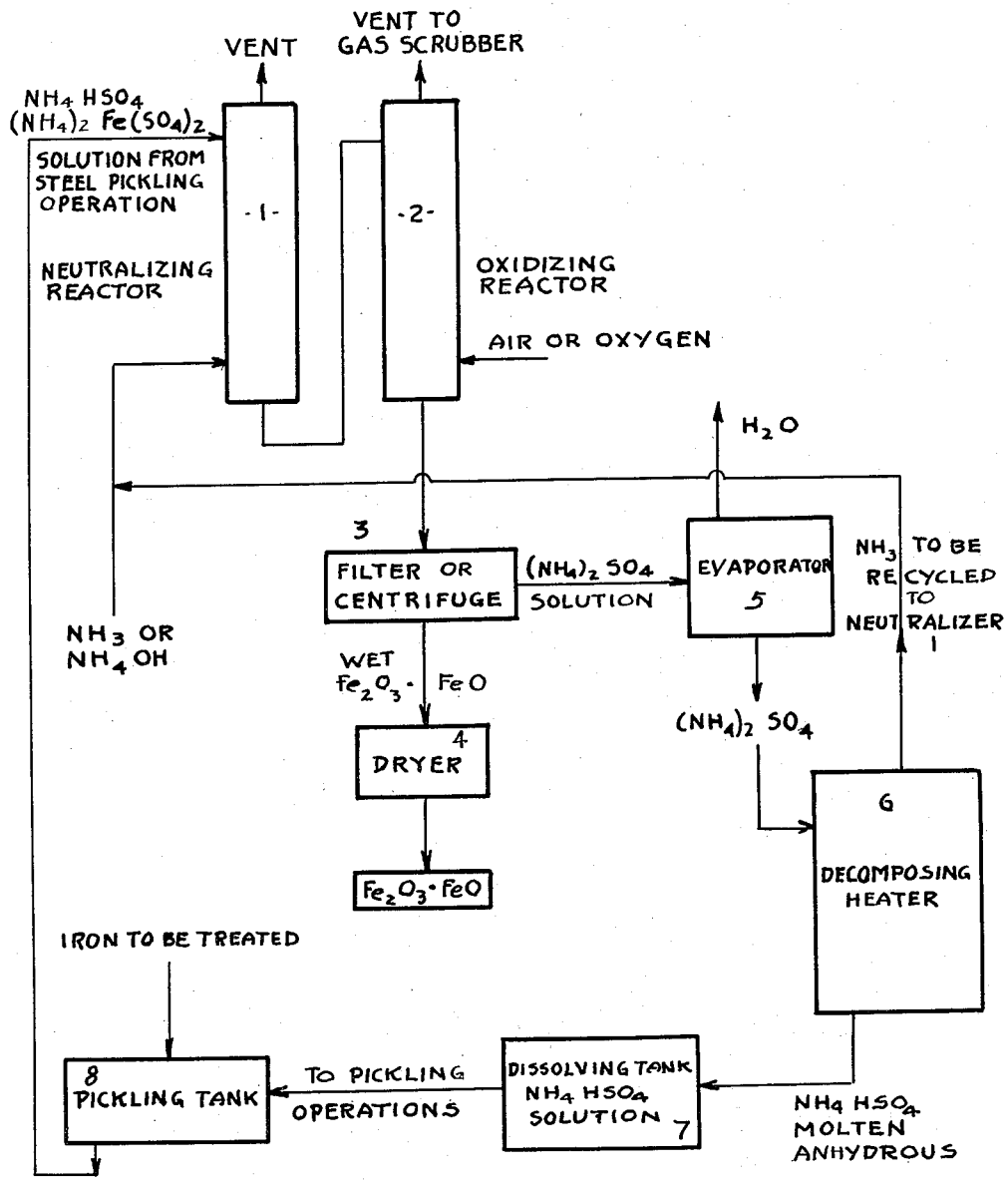
INVENTOR.
CLARK O. MILLER
BY
ATTORNEY.

United States Patent Office 2,700,004
Patented Jan. 18, 1955

2,700,004

METHOD OF PICKLING IRON AND RECOVERING PICKLING AGENT

Clark O. Miller, Cleveland, Ohio, assignor to Cleveland Industrial Research, Inc., Cleveland, Ohio, a corporation of Ohio Application July 15, 1953, Serial No. 368,049

12 Claims. (Cl. 134—13)

This invention relates, as indicated, to a novel method for removal of oxide scale from ferrous metals and to the recovery for re-use of the pickling agent.

Since the inception of the modern steel industry, the removal of oxide scale from the metal prior to rolling or working has been accomplished by means of sulphuric acid, and to a much lesser extent by other mineral acids such as hydrochloric and phosphoric. The reaction of the sulphuric acid with the oxide results in a solution of ferrous sulphate commonly known as "pickle liquor" and because of the vast amounts of steel and iron so treated tremendous amounts of "pickle liquor" were obtained. Until comparatively recent times it was the practice to dispose of the pickle liquor by dumping into the rivers and lakes, resulting in pollution of both navigable and potable waters. Local, state and Federal authorities have campaigned vigorously against such pollution, enacting laws designed to protect the waters from pollution for the benefit of the public and at the same time placing a heavy burden on the iron and steel industries to treat pickle liquor and dispose of the products in less harmful ways.

Many different approaches to the problem of disposal have been suggested or practiced including dumping the spent liquor into deep wells, abandoned mines, sumps or lagoons, adjacent large bodies of water, and sewers leading to rivers, lakes and tidewaters. These involved no chemical treatment and frequently became unavailable through refusal of the collecting device to accept any more spent liquor, or the intervention of the legislature.

Neutralization by means of lime has been used but has proved costly and yielded no saleable by-product.

More elaborate chemical treatment means have been developed among which may be cited the neutralization oxidation process devised by R. D. Hoak and C. J. Sindlinger (Ind. Eng. Chem. 41, 65–70 (1949)). This process yields magnetic iron oxide. The Elzi process (U. S. Pat. 2,427,555) utilizes scrap iron to neutralize the free acid in spent pickle liquor, passes this fluid through a packed tower where it is contacted with coke oven gas yielding a pH of from 7.0 to 7.5, thence through another tower where it is treated with pure ammonia to a pH of 8.0–8.5 and then through an air oxidation tower to oxidize the iron to ferric oxide, recovers the iron oxide by filtration and recovers the ammonium sulphate by evaporation of the filtrate.

The Tiddy process (U. S. Pat. 2,511,307) contacts pickle liquor with ammonia and hydrogen sulphide in two stages. A precipitate of ferrous oxide and ferrous sulphide is separated by decantation and part of the clear liquor is recycled to the pickle liquor. The remainder is further ammonia-treated and the liquor aerated where the iron is oxidized and precipitated. The precipitate is removed and the filtrate evaporated for recovery of ammonium sulphate. The oxide-sulphide residue is sintered to provide a material which can be charged to a blast furnace.

Reference may be had to the report of the Ohio River Valley Water Sanitation Commission, Steel Industry Action Committee, entitled "Disposal of Spent Sulphate Pickling Solutions," October 1952, for a recent anlysis of the methods of treating pickle liquors to reduce stream pollution.

It is a principal object of this invention, therefore, to provide a process for pickling iron or steel which is free of major disposal problems.

The handling of free mineral acid either dilute or concentrated always involves risk to workers. The present invention avoids the use of free acids utilizing instead materials far less dangerous to those handling them.

The amount of sulphuric acid used in pickling processes throughout the world is indeed great and the consumption of this acid is almost directly proportional to the amount of steel produced. During the period of high steel productivity of the war and defense efforts, a serious shortage of sulphur, from which sulphuric acid is made, developed resulting in an increase in the cost of sulphur and its unavailability for other important uses. The material used in the present invention is in abundant supply, low in cost, and in many cases itself presents a disposal problem.

It is another object of this invention, therefore, to provide a process for removal of oxide scale on ferrous metals substituting for the more expensive, more difficultly handled and disposed mineral acids, an inexpensive, easily handled and recoverable material.

Still other objects of this invention will appear as the description proceeds.

To the accomplishment of the foregoing and related ends, said invention, then, consists of the means hereinafter fully described and particularly pointed out in the appended claims, the following description and annexed drawing setting forth in detail certain embodiments of the invention, such disclosed means constituting, however, but a few of the various forms in which the principle of this invention may be employed.

It has been found that ammonium acid sulphate is admirably suited to removal of oxide scale from ferrous metals and that this material is not only readily prepared from the abundantly available ammonium sulphate but may be nearly entirely recovered for re-use in the process thereby vastly restricting disposal problems and relieving steel processors of dependence upon mineral acids.

Broadly stated, therefore, this invention comprises a process for pickling ferrous metal which comprises the steps of immersing said metal in an aqueous pickling bath of ammonium acid sulphate, recovering di-ammonium sulphate from the spent pickle bath, and heating said di-ammonium sulphate to convert it to ammonium acid sulphate and returning said ammonium acid sulphate to the pickling operation.

An illustrative process embodying the principles of this invention is diagrammatically shown in the annexed flow sheet. The pickling bath is composed of an aqueous solution of ammonium acid sulphate at any suitable concentration sufficient to cause a fairly vigorous reaction with the iron oxide scale. Broadly, the initial concentration may range anywhere from 5% to 90% by weight although for most purposes a 10% to 50% aqueous solution may be employed. Of course, as scale is dissolved the concentration of $NH_4HSO_4$ diminishes, but a continuous supply of fresh solution from the recovery unit serves to maintain a satisfactory rate of reaction or pickling. The selected temperature of the pickling bath is dependent upon the speed of reaction desired at a given concentration and may generally range between about 50° C. and 130° C., the more practical range being from about 80° C. to about 110° C.

The time of exposure of the work piece is of course dependent upon the extent of scaling, the concentration and the temperature of the treating bath. These factors also operate in the present sulphuric acid pickling processes so that those skilled in the art of pickling steel will be readily able to familiarize themselves with the behavior of the ammonium acid sulphate baths as it relates to the desired end result. Normally the exposure time ranges from about 30 seconds to 20 minutes or more, depending on a great many production factors.

The present pickling operation results in the formation of ferrous ammonium sulphate. The spent liquor is then cooled and treated with ammonium hydroxide in a neutralizing reactor 1 from ammonia liquor or with anhydrous ammonia resulting in the partial precipitation of the iron as a green gelatinous mass, difficult to filter. The slurry is now at a pH of from 7.0 to about 8.5.

This slurry is then oxidized in an oxidation zone 2 by blowing with air, or contacting with an oxygen containing gas in a packed tower in a counter-current manner. Other suitable oxidation agents, such as hydrogen peroxide, ammonium persulphate, etc. may be used if desired, but air seems to be the most economical. Catalysts for the oxidation reaction, such as $V_2O_5$, $MnO_2$, etc. may be used. The iron is thus caused to precipitate as a black or brown iron oxide, probably a ferroso-ferric oxide complex, which may be readily separated by centrifuging or filtration 3, and dried 4.

These reactions may be represented by the following equations:

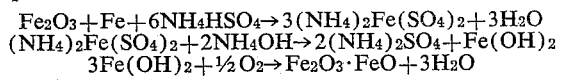

The remaining clear solution contains then only ammonium sulphate with possibly a small amount of ammonium hydroxide. This ammonium sulphate liquor is then concentrated by evaporation in a single or multiple effect evaporator 5 until crystals of diammonium sulphate are, or a mixture of crystals and saturated di-ammonium sulphate solution is obtained.

The diammonium sulphate thus obtained as a by-product may then be converted by heating to the ammonium acid sulphate as shown by the equation:

Both of these decomposition products are returned to the process, the ammonium acid sulphate to the pickle liquor make-up tank, and the ammonia to the precipitation step. It may be necessary from time to time to add additional quantities of each of these materials either as such or by decomposing additional ammonium sulphate. The ammonium acid sulphate (M. P. 146.9° C.) may be agitated, passed over baffles, or blown with an inert gas to insure complete decomposition and removal of the ammonia gas. The decomposition ammonia may be collected either in water to make aqua ammonia or it may be compressed and cooled to yield liquid ammonia. Alternatively, if wet crystals or a slurry of di-ammonium sulphate is fed to the decomposing heater 6 the water is first removed after which the crystals decompose to liberate ammonia which may be condensed along with the steam to form aqua ammonia directly.

The molten ammonium acid sulphate is then pumped from the bottom of the decomposer 6 and dissolved in water 7 to make a hot solution of ammonium acid sulphate of the proper strength required for pickling and then returned to the pickling tank 8.

Ammonium sulphate is singularly adapted to this process because it is readily converted by heat to the pickling agent. Upon treatment of the spent liquor with the base, ammonium sulphate is regenerated and on concentration and heating the pickling agent is reproduced. While other acid salts of sulphuric acid and phosphoric acid are known to pickle iron, no other simple sulphates but the amine or ammonia sulphate may be converted by heat to the acid sulphate, and with the phosphates, the iron phosphates formed on pickling are insoluble causing a removal of phosphate ion from solution leaving nothing to regenerate for re-use. The ferrous ammonium sulphate is water-soluble providing the opportunity for retaining the sulphate ion and recovering ammonium sulphate.

The by-products of this process are steam and oxides of iron. There may be handling losses of ammonia and ammonium acid sulphate in the process, but make-up supplies of each are usually readily available at modern steel mills. Hence the disposal problems are virtually nothing and sulphuric acid may be successfully replaced in pickling processes.

There are many modifications which can be made in the process described without departing substantially from this invention. For example, instead of oxidizing in the alkaline state, i. e., a pH of 7.1 to 8.5, the spent pickle liquor may be oxidized, desirably in the presence of an oxidation catalyst, such as activated carbon; manganese, cobalt or copper salts, etc., prior to the neutralization step utilizing anhydrous or aqua ammonia. It may also be found desirable to neutralize the inhibitive effect of certain added agents prior to the oxidation step. Frequently such agents are included in the pickling bath to control the pickling action.

Heretofore, oxidation in the alkaline state of sulphuric pickle liquor which has been neutralized with ammonia has not met with much favor because the by-product sought was usually di-ammonium sulphate of high purity. This was to be sold on the market according to specifications which severely limited the amount of iron which could be present. Oxidation in the acid state apparently allowed production of di-ammonium sulphate of lower iron content and hence was favored. In the present process, however, it is not a principal object to produce a saleable di-ammonium sulphate of rigidly controlled iron content. Accordingly, it is not essential to work within narrow limits on iron content of the di-ammonium sulphate as this impurity will not adversely affect the di-ammonium sulphate insofar as the present process is concerned. It will be seen, therefore, that depending upon individual preference, either oxidation prior to neutralization or oxidation subsequent to neutralization may be used in the present process.

Another modification that can be made while employing the principles of this invention is that there may be used along with the ammonium acid sulphate the usual sulphuric acid. This may be done where a greater pickling rate is desired. In such event, an amount of $(NH_4)_2SO_4$ equivalent to the added sulphuric acid may be removed from the process at a later stage, or the excess di-ammonium sulphate thus produced converted to ammonium acid sulphate for use in the pickling bath. For example, a 50-50 mixture of 20% aqueous $H_2SO_4$ and 20% aqueous $NH_4HSO_4$ may be used as a pickling bath. Hence the present process is compatible with the old $H_2SO_4$ process and thereby provides in a measure a speed regulation feature over and above such speed of pickling control as may be exercised by controlling temperature, concentration, etc.

It should be understood that this process can be operated either as a continuous process or as a batch process.

In order to improve the speed of reaction, a wetting agent may be incorporated in the original pickle bath.

As indicated above, one of the by-products of the present invention is believed to be a ferroso-ferric oxide complex. This material may be recovered for the production of pigmentary materials, or after a sintering process returned to the blast furnace. The by-product of the decomposition step, namely, ammonia, may be returned to the process at the neutralization step either as ammonia gas or as aqua ammonia. Where the present process is used as an adjunct to the usual pickling process utilizing dilute sulphuric acid, an excess amount of di-ammonium sulphate substantially equivalent to the amount of sulphuric acid originally introduced and over and above that obtained from the $NH_4HSO_4$ will be obtained. This material may be withdrawn from the process to keep the quantities of materials in balance. It will be understood that where sulphuric acid is used in conjunction with this process, additional ammonia or aqua ammonia will be required for neutralization purposes. Only a portion of the total amount of $(NH_4)_2SO_4$ will then be decomposed and returned to the process as $NH_4HSO_4$, the remainder being disposed of in the usual chemical markets, i. e., fertilizer.

Other modes of applying the principles of this invention may be employed instead of those specifically set forth above, change being made as regards the details herein disclosed, provided the elements set forth in any of the following claims, or the equivalent of such be employed.

I, therefore, particularly point out and distinctly claim as my invention:

1. A process for pickling ferrous metal which comprises the steps of immersing said metal in an aqueous pickling bath of ammonium acid sulphate to yield ferrous ammonium sulphate in aqueous solution, then by a process including the steps of oxidation and raising the pH to at least 7 with an ammonia-containing fluid, thereby converting said ferrous ammonium sulphate to oxide of iron and di-ammonium sulphate, recovering di-ammonium sulphate from the resulting solution, and heating said di-ammonium sulphate to convert it to ammonium acid sulphate and returning said ammonium acid sulphate to the pickling operation.

2. A process for pickling ferrous metal which comprises the steps of immersing said metal in an aqueous pickling bath of ammonium acid sulphate to yield ferrous ammonium sulphate in aqueous solution, oxidizing the spent pickle liquor and then raising the pH to at least 7 with an ammonia-containing fluid, thereby converting said ferrous ammonium sulphate to oxide of iron and di-ammonium sulphate, recovering di-ammonium sulphate from the resulting solution, and heating said di-ammonium sulphate to convert it to ammonium acid sulphate and returning said ammonium acid sulphate to the pickling operation.

3. A process for pickling ferrous metal which comprises the steps of immersing said metal in an aqueous pickling bath of ammonium acid sulphate to yield ferrous ammonium sulphate in aqueous solution, raising the pH of the spent pickle liquor to at least 7 with an ammonia-containing fluid and then oxidizing the mass in the alkaline state thereby converting said ferrous ammonium sulphate to oxide of iron and di-ammonium sulphate, recovering di-ammonium sulphate from the resulting solution, and heating said di-ammonium sulphate to convert it to ammonium acid sulphate and returning said ammonium acid sulphate to the pickling operation.

4. A process for pickling ferrous metal which comprises the steps of immersing said metal in an aqueous pickling bath of ammonium acid sulphate to yield ferrous ammonium sulphate in aqueous solution, simultaneously oxidizing and raising the pH to at least 7 with an ammonia-containing fluid, thereby converting said ferrous ammonium sulphate to oxide of iron and di-ammonium sulphate, recovering di-ammonium sulphate from the resulting solution, and heating said di-ammonium sulphate to convert it to ammonium acid sulphate and returning said ammonium acid sulphate to the pickling operation.

5. A process for pickling ferrous metal which comprises the steps of immersing said metal in an aqueous pickling bath of ammonium acid sulphate, raising the pH of the spent pickle liquor to above about 7.5 with an ammonia-containing fluid, oxidizing the spent pickle liquor in the alkaline state to precipitate oxides of iron and yield an aqueous solution containing di-ammonium sulphate, recovering di-ammonium sulphate from said solution, and heating said di-ammonium sulphate to convert it to ammonium acid sulphate, and replenishing the ammonium acid sulphate content of said aqueous pickling bath.

6. A process for pickling ferrous metal which comprises the steps of immersing said metal in an aqueous pickling bath of ammonium acid sulphate, said bath being maintained at a temperature of at least about 50° C. and containing from about 10% to about 50% by weight of ammonium acid sulphate, raising the pH of the spent pickle liquor to above about 7.5 with an ammonia-containing fluid, oxidizing the alkaline spent pickle liquor with an oxygen-containing gas to precipitate oxides of iron and yield an aqueous solution containing di-ammonium sulphate, recovering di-ammonium sulphate from said solution, and heating said di-ammonium sulphate to convert it to ammonium acid sulphate and replenishing the ammonium acid sulphate content of said aqueous pickling bath.

7. A process in accordance with claim 6 in which the ammonia-containing fluid is ammonia gas.

8. A process in accordance with claim 6 in which the ammonia-containing fluid is ammonia-water.

9. A process in accordance with claim 6 in which the oxygen-containing gas is air.

10. A process for pickling ferrous metal which comprises immersing said metal in an aqueous pickling bath of ammonium acid sulphate at a temperature of from about 50° C. to 130° C., the concentration of ammonium acid sulphate in said bath being from about 10% to about 50% by weight, and the time of immersion being sufficient to remove the oxide scale from said metal, treating the spent pickle liquor with aqueous ammonium hydroxide solution to raise the pH of the solution up to from 7.1 to about 8.5, blowing the alkaline solution with air to precipitate oxides of iron, filtering, concentrating the filtrate by evaporation to recover di-ammonium sulphate, heating the di-ammonium sulphate to regenerate ammonium acid sulphate, and replenishing the ammonium acid sulphate content of said aqueous pickling bath.

11. A process for pickling ferrous metal which comprises the steps of immersing said metal in an aqueous pickling bath of ammonium acid sulphate to yield ferrous ammonium sulphate in aqueous solution, then by a process including the steps of oxidation and raising the pH of said solution to at least 7 with an ammonia-containing fluid, thereby converting said ferrous ammonium sulphate to oxide of iron and di-ammonium sulphate, recovering di-ammonium sulphate from the resulting solution, and heating said di-ammonium sulphate to convert it to ammonium acid sulphate and ammonia, and returning said ammonium acid sulphate to the pickling operation and said ammonia to the neutralization step.

12. A process for pickling ferrous metal which comprises the steps of immersing said metal in an aqueous pickling bath of ammonium acid sulphate and sulphuric acid to yield ferrous ammonium sulphate in aqueous solution, then by a process including the steps of oxidation and raising the pH of said solution to at least 7 with an ammonia-containing fluid, thereby converting said ferrous ammonium sulphate to oxide of iron and di-ammonium sulphate, recovering di-ammonium sulphate from the resulting solution and heating a portion of said di-ammonium sulphate to convert it to ammonium acid sulphate and returning said ammonium acid sulphate to the pickling operation.

No references cited.